(12) United States Patent
Teboulle

(10) Patent No.: US 11,740,112 B2
(45) Date of Patent: Aug. 29, 2023

(54) METHOD OF MEASURING THE SPEED OF A FLUID

(71) Applicant: SAGEMCOM ENERGY & TELECOM SAS, Rueil Malmaison (FR)

(72) Inventor: Henri Teboulle, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 457 days.

(21) Appl. No.: 16/921,403

(22) Filed: Jul. 6, 2020

(65) Prior Publication Data

US 2021/0010840 A1 Jan. 14, 2021

(30) Foreign Application Priority Data

Jul. 12, 2019 (FR) ...................................... 1907869

(51) Int. Cl.
*G01F 1/00* (2022.01)
*G01F 1/667* (2022.01)
(Continued)

(52) U.S. Cl.
CPC ........... *G01F 1/668* (2013.01); *G01N 29/024* (2013.01); *G01P 5/248* (2013.01)

(58) Field of Classification Search
CPC ........ G01F 1/668; G01N 29/024; G01P 5/248
See application file for complete search history.

(56) References Cited

U.S. PATENT DOCUMENTS 4,782,697 A * 11/1988 Williams, 3rd ......... G01P 5/245
73/170.13
5,178,018 A * 1/1993 Gill ........................ G01F 1/668
73/861.28
(Continued)

FOREIGN PATENT DOCUMENTS

EP 0051293 A1 5/1982
EP 0670477 A2 9/1995
(Continued)

OTHER PUBLICATIONS

Von Jena, A et al.; "Ultrasound gas-flow meter for household application"; Sensors and Actuators A: Physical, Elsevier BV, NL, vol. 37-38, Jun. 1, 1993, pp. 135-140 (XP-026576876).

*Primary Examiner* — Jamel E Williams
(74) *Attorney, Agent, or Firm* — Muncy, Geissler, Olds & Lowe, P.C.

(57) ABSTRACT

A method of measuring the speed of a fluid, comprising the successive steps of: causing the processor component to emit at the same emission time both a first electrical excitation signal that is applied as input to a first transducer and also a second electrical excitation signal that is applied as input to a second transducer, such that the first transducer generates a first ultrasonic signal and such that the second transducer generates a second ultrasonic signal; putting the processor component on standby; reactivating the processor component after a predetermined standby duration; causing the first ultrasonic signal to be acquired by the second transducer and then by the processor component, and causing the second ultrasonic signal to be acquired by the first transducer and then by the processor component; using a value DToF to estimate the speed of the fluid.

14 Claims, 2 Drawing Sheets

(51) Int. Cl.
  *G01N 29/024* (2006.01)
  *G01P 5/24* (2006.01)

(56) References Cited

U.S. PATENT DOCUMENTS

2004/0107779 A1* 6/2004 Kishimoto .............. G01P 5/245
                                                      73/861.29
2012/0271568 A1* 10/2012 Wilson .................... G01F 1/668
                                                         702/48
2020/0326216 A1* 10/2020 Sarkissian .............. G06Q 50/06

FOREIGN PATENT DOCUMENTS

WO    WO-2012129101 A1 *  9/2012  ............... G01F 1/66
WO    WO-2019/002145 A1     1/2019
WO    WO-2019002145 A1 *   1/2019  ............... G01F 1/66

* cited by examiner

METHOD OF MEASURING THE SPEED OF A FLUID

The invention relates to the field of ultrasonic fluid meters.

BACKGROUND OF THE INVENTION

In order to measure the flow rate of a fluid flowing in a pipe, an ultrasonic fluid flow meter conventionally makes use of a device for measuring the speed of the fluid by emitting and receiving ultrasonic signals.

The measurement device includes a duct connected to the pipe in which the fluid flows. In order to measure the fluid speed, ultrasonic signals are emitted into the duct to travel along a path of defined length, the travel times taken by the ultrasonic signals to travel along the path of defined length both from upstream to downstream and from downstream to upstream are measured, and the speed of the fluid is estimated on the basis in particular of the defined length and of the difference between the travel times.

Such a measurement device 1, sometimes referred to as a "classical pipe" device, is shown in FIG. 1. The measurement device 1 comprises a first transducer 2a, a second transducer 2b, and a measurement module 3 connected to the first transducer 2a and to the second transducer 2b.

The first transducer 2a and the second transducer 2b are paired in terms of frequency and emission level. By way of example, the first transducer 2a and the second transducer 2b are piezoelectric transducers.

In this example, the path of defined length is thus a rectilinear path of length L between the first transducer 2a and the second transducer 2b.

The measurement module 3 produces an electrical excitation signal 4 that is applied as input to the first transducer 2a.

On the basis of the electrical excitation signal 4, the first transducer 2a emits an ultrasonic signal 5. The second transducer 2b receives an ultrasonic signal 6 resulting from the ultrasonic signal 5 propagating in the fluid.

The measurement module 3 measures the travel time taken by the ultrasonic signal 5 to travel along the path of defined length from upstream to downstream.

In reality, the measurement module 3 measures a global transfer time $T_{AB}$ from the first transducer 2a to the second transducer 2b.

The global transfer time $T_{AB}$ is such that:

$$T_{AB} = TA_A + ToF_{AB} + TR_B,$$

where:

$TA_A$ is a switch-on time of the first transducer 2a;

$ToF_{AB}$ corresponds to the time of flight taken by the ultrasonic signal 5 to travel along the path of defined length between the first transducer 2a and the second transducer 2b;

$TR_B$ is a reception time of the second transducer 2b.

Likewise, the second transducer 2b emits an ultrasonic signal that is received by the first transducer 2a.

The measurement model 3 measures the global transfer time $T_{BA}$, which is such that:

$$T_{BA} = TA_B + ToF_{BA} + TR_A,$$

where:

$TA_B$ is a switch-on time of the second transducer 2b;

$ToF_{BA}$ corresponds to the time of flight taken by the ultrasonic signal to travel along the path of defined length between the second transducer 2b and the first transducer 2a;

$TR_A$ is a reception time of the first transducer 2a.

Assuming that:

$TA_A = TA_B$ and $TR_A = TR_B$ (paired transducers); the following is obtained:

$$\Delta T = T_{BA} - T_{AB} = ToF_{BA} - ToF_{AB} = DToF,$$

where DToF is the time-of-flight difference.

However, the DToF is proportional to the mean speed $\bar{V}$ of the fluid, and the measurement module 3 then calculates the mean speed $\bar{V}$ of the fluid using the following formula:

$$DToF = 2L \cdot \bar{V}/(C^2 - \bar{V}^2),$$

where C is the speed of an ultrasonic wave in the fluid. For example, the speed of an ultrasonic wave in water is equal to approximately 1500 meters per second (m/s), and it depends on the temperature of the water.

The measurement module 3 then deduces the flow rate of the fluid flowing in the pipe from the signed mean speed $\bar{V}$.

An ultrasonic fluid meter, as described above, is generally powered by one or more batteries included in the meter.

However, the functional specifications of such a meter conventionally require it to have a lifetime without changing the battery (ies) that is very long, typically equal to 20 years. For cost and integration reasons, it is essential to limit the size and the number of batteries used. It is therefore appropriate to ensure that the electricity consumption of the measurement device is as small as possible. Naturally, such limitation of the electricity consumption must not lead to any degradation in the accuracy with which the fluid flow is measured.

OBJECT OF THE INVENTION

An object of the invention is to reduce the electricity consumption of an ultrasonic fluid meter, and to increase the accuracy of the flow rate measurements taken by said ultrasonic fluid meter.

SUMMARY OF THE INVENTION

In order to achieve this object, there is provided a measurement method for measuring a fluid speed, the method being performed by a measurement device comprising a first transducer, a second transducer, and a measurement module comprising a processor component, the measurement method comprising at least a first measurement stage comprising the following successive steps:

causing the processor component to emit at the same emission time both a first electrical excitation signal that is applied as input to the first transducer and also a second electrical excitation signal that is applied as input to the second transducer, such that the first transducer generates a first ultrasonic signal that travels through the fluid to the second transducer along a path of defined length, and such that the second transducer generates a second ultrasonic signal that travels in the opposite direction through the fluid to the first transducer along the path of defined length;

putting the processor component on standby;

reactivating the processor component after a predetermined standby duration;

causing the first ultrasonic signal to be acquired by the second transducer and then by the processor component, and causing the second ultrasonic signal to be acquired by the first transducer and then by the processor component;

estimating the value DToF of the difference between a second time of flight of the second ultrasonic signal and a first time of flight of the first ultrasonic signal, and using the value DToF to estimate the speed of the fluid.

During each first measurement stage, the processor component is put on standby for a predetermined standby duration. During this predetermined standby duration, the electricity consumption of the processor component is almost zero, thereby significantly reducing the electricity consumption of the measurement device.

Since the first and second electrical excitation signals are emitted at the same time, emission of the first and second ultrasonic signals is accurately synchronized. Thus, the loss of the reference time that results from putting the processor component on standby, is not penalizing for estimating the value DToF, and the fluid speed measurements that are made of very accurate.

There is also provided a measurement method as described above, further comprising at least one second measurement stage used for estimating a value SumToF for the sum of the first time of flight plus the second time of flight, with estimation of the speed of the fluid making use also of the value SumToF.

There is also provided a measurement method as described above, the second measurement stage being similar to the first measurement stage, but not including the step of putting the processor component on standby.

There is also provided a measurement method as described above, wherein a plurality of first measurement stages are performed between two successive second measurement stages, and wherein, for each first measurement stage, the fluid speed is estimated while using the value SumToF as obtained during the latest second measurement stage preceding said first measurement stage.

There is also provided a measurement method as described above, wherein the speed of the fluid is estimated using the formula:

$$\overline{V} = 2L \cdot \frac{DToF}{SumToF^2 - DToF^2}$$

where L is the defined length of the path.

There is also provided a measurement method as described above, the processor component being a microcontroller having integrated therein an analog to digital converter (ADC) having first and second inputs that are multiplexed, the first measurement stage including the step of applying the first ultrasonic signal, after it has been received, to the first input in order to be digitized, and the step of applying the second ultrasonic signal, after it has been received, to the second input in order to be digitized.

There is also provided a measurement method as described above, further comprising a calibration stage comprising the step of compensating a phase offset between the sampling operations performed by the ADC when sampling the first and second ultrasonic signals.

There is also provided a measurement method as described above, the processor component being a microcontroller having integrated therein a first ADC having a first input and a second ADC having a second input, the first measurement stage including the step of applying the first ultrasonic signal, after it has been received, to the first input in order to be digitized, and the step of applying the second ultrasonic signal, after it has been received, to the second input in order to be digitized.

There is also provided a measurement method as described above, wherein each of the first and second ultrasonic signals comprises in succession preliminary lobes and then measurement lobes, the measurement lobes being used for estimating the value DtoF, the preliminary lobes not being used since they are potentially inaccurate, the predetermined standby duration being such that the processor component is reactivated after at least some of the preliminary lobes of the first ultrasonic signal have been received by the second transducer and at least some of the preliminary lobes of the second ultrasonic signal have been received by the first transducer.

There is also provided a measurement method as described above, wherein the value DToF is estimated by performing a zero crossing type method both on the first ultrasonic signal and on the second ultrasonic signal.

There is also provided a measurement method as described above, wherein the value DToF is estimated by performing a cross correlation method on the first and second ultrasonic signals.

There are also provided an ultrasonic fluid meter comprising a first transducer, a second transducer, and a measurement module connected to the first transducer and to the second transducer, the ultrasonic fluid meter being arranged to perform the measurement method as described above.

There is also provided a computer program including instructions for enabling a microcontroller of an ultrasonic fluid meter to perform the measurement method as described above.

There are also provided storage means, characterized in that they store a computer program including instructions for enabling a microcontroller of an ultrasonic fluid meter to perform the measurement method as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
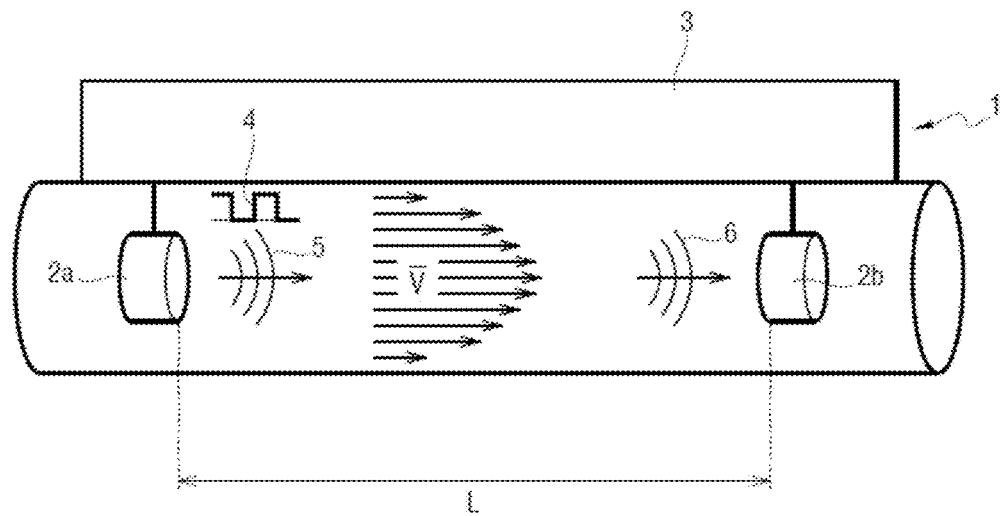
FIG. 1 shows a prior art ultrasonic fluid meter.
Figure 2:
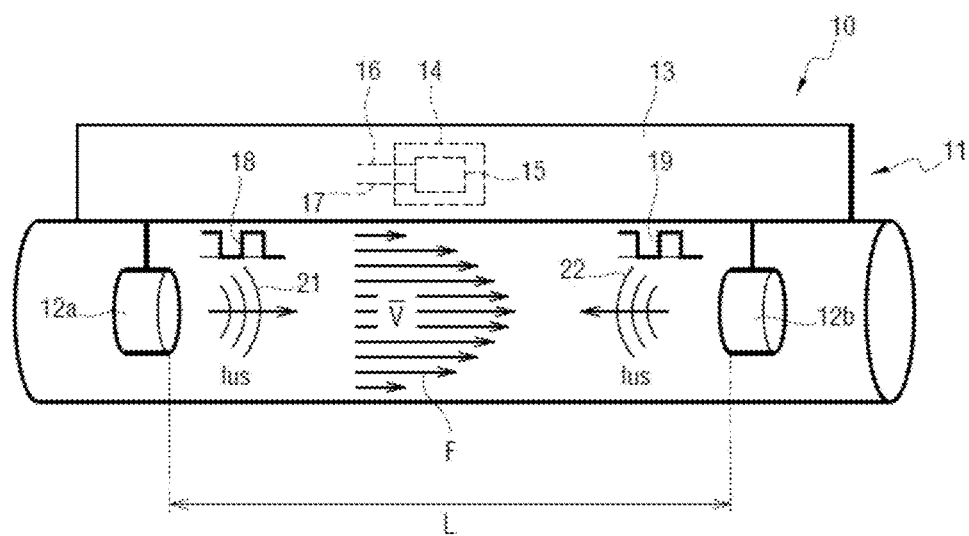
FIG. 2 shows an ultrasonic fluid meter in which the method of the invention for measuring a fluid speed is performed.

With reference to FIG. 2, the method of the invention for measuring a fluid speed is performed in this example in an ultrasonic water meter 10.

The ultrasonic water meter 10 comprises both a duct through which there flows water delivered by a distribution network to an installation, and also a water speed measurement device 11.

Water flows in the duct from upstream to downstream, as represented by the direction of arrows F, however it could equally well flow from downstream to upstream.

The measurement device 11 comprises a first transducer 12a, a second transducer 12b, and a measurement module 13 connected to the first transducer 12a and to the second transducer 12b.

The first transducer 12a and the second transducer 12b are paired. In this example, the first and second transducers 12a and 12b are piezoelectric transducers.

The measurement module 13 includes a processor component adapted to execute instructions of a program for performing the measurement method of the invention. In this example, the processor component is a microcontroller 14. An ADC 15 is included in the microcontroller 14. The ADC 15 has first and second inputs 16 and 17, which are multiplexed.

As explained above, it is possible to determine the mean speed $\bar{V}$ of the fluid by using the formula:

$$DToF = 2L \cdot \bar{V}/(C^2 - \bar{V}^2),$$

where C is the speed of an ultrasonic wave in the fluid. However, C depends on the temperature of the fluid.

It can be shown that the speed $\bar{V}$ of the fluid can also be expressed using a formula from which C is eliminated, and which therefore does not need the temperature of the fluid to be measured:

$$\bar{V} = 2L \cdot \frac{DToF}{SumToF^2 - DToF^2}$$

where SumToF is the sum of the first time of flight plus the second time of flight.

By using SumToF, there is thus no need for any measurement of the temperature of the water, thereby reducing the cost of the measurement device 11.

The measurement method of the invention enables SumToF and DToF to be determined accurately, while very greatly reducing the electricity consumption of the measurement device 11 and thus of the ultrasonic water meter 10.

The measurement method of the invention operates as follows.

The measurement method comprises first measurement stages and second measurement stages.

The description begins with a first measurement stage.

The microcontroller 14 is caused to emit both a first electrical excitation signal 18 that is applied as input to the first transducer 12a, and also a second electrical excitation signal 19 that is applied as input to the second transducer 12b.

The term "is caused to emit" is used to mean that it is the microcontroller 14 that controls emission both of the first electrical excitation signal 18 and also of the second electrical excitation signal 19. The first and second electrical excitation signals 18 and 19 are thus either generated directly by the microcontroller 14, or else they are generated by some other component under the control of the microcontroller 14.

The first electrical excitation signal 18 is a square wave signal of frequency fus having a duty ratio of ½. Likewise, the second electrical excitation signal 19 is a square wave signal of frequency fus having a duty ratio of ½. The frequency fus conventionally lies in the range 900 kilohertz (kHz) to 4 megahertz (MHz), and in this example (when the fluid is water) it is equal to 2 MHz. When the fluid is a gas, the frequency fus is conventionally of the order of a few tens of kilohertz.

Figure 3:
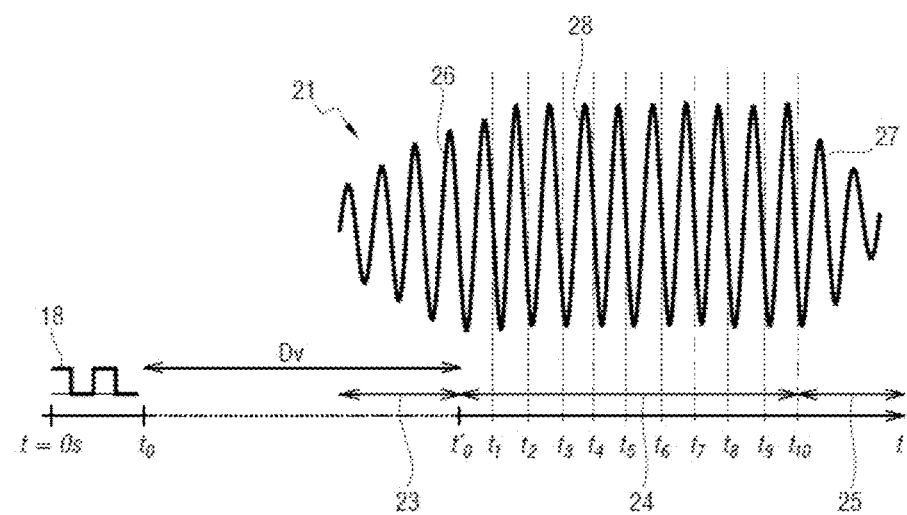
FIG. 3 shows the first ultrasonic signal received after it has travelled through the fluid along a path of defined length, together with a time axis showing the predetermined standby duration during which the processor component is on standby.

With reference to FIG. 3, the first electrical excitation signal 18 and the second electrical excitation signal 19 (not shown in FIG. 3) are emitted at exactly the same moment, at the same emit time t=0 seconds (s) (which corresponds to the first wavefront of the first electrical excitation signal 18 and to the first wavefront of the second electrical excitation signal 19). The first and second electrical excitation signals 18 and 19 are thus applied at the same time as inputs respectively to the first and second transducers 12a and 12b. This accurate synchronization is made possible by the fact that it is the microcontroller 14 that determines the emit time for both of these electrical excitation signals.

Under the effect of the first excitation signal 18, the first transducer 12a then generates a first ultrasonic signal 21 that travels through the fluid along a path of defined length L until it reaches the second transducer 12b. Meanwhile, under the effect of the second electrical excitation signal 19, the second transducer 12b generates a second ultrasonic signal 22 that travels in the opposite direction through the fluid along the path of defined length L until it reaches the first transducer 12a.

It should be observed that, because of the linearity of the phenomenon of ultrasound transmission within a fluid flowing in a duct, the first and second transducers 12a and 12b transmitting the first and second ultrasonic signals 21 and 22 simultaneously, and specifically with identical waveforms, does not lead to any disturbance to reception at the other end of the duct by either of the first and second transducers 12a and 12b. Interference does indeed occur when the waves cross in the middle of the duct, but no change of waveform occurs on reception after leaving the interference zone.

After the first and second electrical excitation signals 18 and 19 have been emitted in full, i.e. at time $t_0$, the microcontroller 14 goes on standby. Its electricity consumption is thus almost zero.

Thereafter, the microcontroller 14 is reactivated after a predetermined standby duration.

The second transducer 12b and then the microcontroller 14 acquire the first ultrasonic signal 21. The first transducer 12a and then the microcontroller 14 acquire the second ultrasonic signal 22. The microcontroller 14 then analyzes the first and second ultrasonic signals 21 and 22 after they have been received, and it deduces the speed of the water from this analysis.

As can be seen in FIG. 3, after being received by the second transducer 12b, the first ultrasonic signal 21 comprises a preliminary zone 23, a measurement zone 24, and a final zone 25. The second ultrasonic signal 22 is not shown in FIG. 3, but after being received it presents a waveform that is similar.

The preliminary zone 23 corresponds to a zone in which the frequency of the first ultrasonic signal 21, on being emitted, is still not yet exactly at the frequency fus of the first electrical excitation signal 18. On being received by the second transducer 12b, the frequency of the first ultrasonic signal 21 is thus not yet exactly the same as the frequency of the first electrical excitation signal 18, but corresponds rather to the resonant frequency of the piezoelectric component. In this example, the preliminary zone 23 has four preliminary lobes 26. Herein, the term "lobe" is used to mean a positive half-period of the received first ultrasonic signal 21.

The final zone 25 corresponds to a portion of the first ultrasonic signal 21 that has passed through metal zones of the meter 10 prior to being received by the transducer 12b. The final zone 25 corresponds to the so-called "multi-path" phenomenon. In the final zone 25, the received first ultrasonic signal 21 is noisy as a result of the multiple paths. In this example, the final zone has two final lobes 27.

In contrast, in the measurement zone 24, the frequency of the received first ultrasonic signal 21 is indeed equal to the frequency fus. The measurement zone 24 has ten measurement lobes 28.

No account is taken of the preliminary and final zones 23 and 25, since the preliminary lobes 26 and the final lobes 27 are inaccurate. This improves the accuracy with which the speed of the fluid is measured.

It should be observed that the predetermined standby duration, during which the microcontroller 14 is on standby, is such that the microcontroller 14 is reactivated after at least some of the preliminary lobes 26 of the first ultrasonic signal 21 have already been received by the second transducer 12b. In this example, and specifically, the microcontroller 14 is reactivated at the instant $t'_0$, which occurs after receiving the fourth preliminary lobe 26, at about the moment when the falling wavefront of the fourth preliminary lobe 26 crosses zero.

Likewise, the microcontroller 14 is reactivated after at least some of the preliminary lobes 26 of the second ultrasonic signal 22 have been received by the first transducer 12a.

For a measurement device 11 in which the defined length L of the path is equal to 7 centimeters (cm), the duration between the time t=0 s and the time t10, which corresponds to the end of the measurement, is about 75 microseconds (μs).

The predetermined standby duration $D_v$, which extends between the time $t_0$ and the time $t'_0$, corresponds to the first and second ultrasonic signals 21 and 22 travelling through water, and it is about 50 μs ($=t'_0-t_0$).

The time during which the microcontroller 14 is consuming electricity is thus reduced by ⅔.

The first ultrasonic signal 21 is then applied to the first input 16 of the ADC 15 in order to be digitized. The second ultrasonic signal 22 is then applied to the second input 17 of the ADC 15 in order to be digitized. For a signal of frequency fus=2 MHz, the sampling frequency is typically 8 MHz in order to comply with the Shannon criterion.

The first and second ultrasonic signals 21 and 22 are sampled quasi-simultaneously. Nevertheless, there exists a phase offset between the sampling operations.

The measurement method of the invention thus includes a calibration stage in the factory, for compensating the phase offset between the operations of sampling the first ultrasonic signal 21 and the second ultrasonic signal 22.

The microcontroller 14 then estimates a first measurement time. In this example, the first measurement time is one of the zero crossings $t_k$ of the first ultrasonic signal 21 in the measurement zone 24. It is assumed that the first measurement time is an $i^{th}$ zero crossing time (i.e. $t_i$) of the first ultrasonic signal 21 in its measurement zone 24.

The microcontroller 14 also estimates a second measurement time. The second measurement time is one of the zero crossings $t_1, \ldots, t_k$ of the second ultrasonic signal 22 in the measurement zone 24. The second measurement time is also the $i^{th}$ zero crossing time (i.e. $t_i$) of the second ultrasonic signal 22 in its measurement zone 24.

For each of the first and second ultrasonic signals 21 and 22, the zero crossing time $t_i$ is measured by a zero crossing type method that involves sinusoidal interpolation performed on the measurement samples of each measurement lobe 28 in the measurement zone 24.

Since the microcontroller 14 has been put on standby during the predetermined standby duration $D_v$, the first and second measurement times do not enable $ToF_{AB}$ and $ToF_{BA}$ to be obtained directly in accurate manner.

The microcontroller 14 thus calculates the difference between the second measurement time and the first measurement time.

Since the first and second electrical excitation signals 21 and 22 were generated at exactly the same emission time, the time references cancel and the following applies:

$$t_{mes2}-t_{mes1}=ToF_{BA}-ToF_{AB}=DToF,$$

where $t_{mes1}$ is the first measurement time and $t_{mes2}$ is the second measurement time.

Since the first and second excitation signals 21 and 22 are subjected to identical emission noise, the noise cancels when measuring DToF.

DToF is thus measured during the first measurement stage.

As explained above, estimating the speed of the fluid without measuring temperature also requires knowledge of SumToF.

SumToF is measured during a second measurement stage.

The second measurement stage is similar to the first measurement stage, except that the microcontroller 14 is not put on standby.

The microcontroller 14 thus emits (or causes to be emitted) the first and second electrical excitation signals 18 and 19, and then receives the first and second ultrasonic signals 21 and 22 after they have travelled in opposite directions along the path of defined length L.

The ADC 15 samples the first and second ultrasonic signals 21 and 22 after they have been received. The microcontroller 14 determines the first measurement time, which does indeed correspond to $ToF_{AB}$, and the second measurement time, which does indeed correspond to $ToF_{AA}$.

The microcontroller 14 then calculates the total sum of the times of flight SumToF_tot as follows:

$$\text{Sum}ToF\_tot=ToF_{AB}+ToF_{BA},$$

and the sum of the times of flight SumToF is calculated by subtracting from the total sum of the times of flight SumToF_tot both the switch-on times $TA_A$ and $TA_B$ and also the reception times $TR_A$ and $TR_B$, which are determined during a stage of calibrating the measurement device 11.

The microcontroller 14 can thus estimate the speed of the fluid accurately.

It should be observed that SumToF depends mainly on the defined length L of the path and on the temperature of the water, since SumToF depends on the speed of sound C in the water, which in turn depends on the temperature of the water. SumToF varies in insignificant manner with varying speed of the water, since that speed is negligible compared with C. The temperature of the water varies very slowly.

There is therefore no need to produce a new measurement of SumToF each time that a new estimate is generated for the speed of the water.

For example, if eight metrological measurements are taken per second, i.e. if a new measurement of the speed of the water is provided eight times per second, SumToF may be measured only once every 2 seconds (i.e. only one in sixteen times). It can be assumed that the temperature of the water does not vary significantly in such a short length of time. It should be observed that when measuring SumToF, DToF is also measured.

A certain number of first measurement stages are thus performed between two successive second measurement stages.

At the end of each first measurement stage, the speed of the water is calculated by using DToF as estimated during said first measurement stage, and both SumToF and DToF are estimated during the last second measurement stage preceding said first measurement stage. Since the defined length L of the path does not vary at all and since the temperature of the water varies only very slowly, SumToF varies very little between two second measurement stages. This method is thus very accurate and it enables electricity consumption to be reduced by putting the microcontroller 14 on standby during each first stage.

It should be observed that the invention is entirely digital and can therefore be implemented purely in software form.

Thus, compared with most prior art fluid speed measurement devices, which are mainly analog, the invention is simultaneously less expensive, less complex, more accurate, and presents considerably lower electricity consumption.

Naturally, the invention is not limited to the embodiment described, but covers any variant coming within the ambit of the invention as defined by the claims.

Naturally, the invention applies regardless of the positioning and the configuration of the first and second transducers. The ultrasonic signals may be emitted with an orientation at an angle that is arbitrary relative to a longitudinal axis of the duct. The ultrasonic signals may be reflected by reflectors, e.g. by mirrors at an angle of 45°.

The fluid for which the speed and the flow rate are measured need not necessarily be water, but for example, it could be an oil, a gas, etc.

In order to measure SumToF and DToF, the description above makes use of a zero crossing type method. It is entirely possible to estimate SumToF and DToF by using a different method, e.g. a cross correlation method.

In the above description, a microcontroller is used that has a single ADC with two multiplexed inputs. This configuration is inexpensive but, as described above, it requires a small phase offset to be compensated during a calibration stage.

As an alternative, it is possible to use a microcontroller having integrated therein a first ADC having a first input and a second ADC having a second input. On reception, the first ultrasonic signal is then applied to the first input of the first ADC in order to be digitized. On reception, the second ultrasonic signal is also applied to the second input of the second ADC in order to be digitized. Under such circumstances, both of the signals received from the transducers are sampled at instants that are accurately synchronized. This solution, which is slightly more accurate than the first solution, is also slightly more expensive, since microcontrollers having two genuine ADCs are more expensive.

The invention claimed is:

1. A measurement method for measuring a fluid speed, the method being performed by a measurement device comprising a first transducer, a second transducer, and a measurement module comprising a processor component, the measurement method comprising at least a first measurement stage comprising the following successive steps:
    causing the processor component to emit at the same emission time both a first electrical excitation signal that is applied as input to the first transducer and also a second electrical excitation signal that is applied as input to the second transducer, such that the first transducer generates a first ultrasonic signal that travels through the fluid to the second transducer along a path of defined length, and such that the second transducer generates a second ultrasonic signal that travels in the opposite direction through the fluid to the first transducer along the path of defined length;
    putting the processor component on standby;
    reactivating the processor component after a predetermined standby duration ($D_v$);
    causing the first ultrasonic signal to be acquired by the second transducer and then by the processor component, and causing the second ultrasonic signal to be acquired by the first transducer and then by the processor component;
    estimating a value DToF of a difference between a second time of flight of the second ultrasonic signal and a first time of flight of the first ultrasonic signal, and using the value DToF to estimate the speed of the fluid.

2. The measurement method according to claim 1, further comprising at least one second measurement stage used for estimating a value SumToF for the sum of the first time of flight plus the second time of flight, with estimation of the speed of the fluid making use also of the value SumToF.

3. The measurement method according to claim 2, the second measurement stage being similar to the first measurement stage, but not including the step of putting the processor component on standby.

4. The measurement method according to claim 2, wherein a plurality of first measurement stages are performed between two successive second measurement stages, and wherein, for each first measurement stage, the fluid speed is estimated while using the value SumToF as obtained during the latest second measurement stage preceding said first measurement stage.

5. The measurement method according to claim 2, wherein the speed of the fluid is estimated using the formula:

$$\overline{V} = 2L \cdot \frac{DToF}{SumToF^2 - DToF^2}$$

where L is the defined length of the path.

6. The measurement method according to claim 1, the processor component being a microcontroller having integrated therein an ADC having first and second inputs that are multiplexed, the first measurement stage including the step of applying the first ultrasonic signal, after it has been received, to the first input in order to be digitized, and the step of applying the second ultrasonic signal, after it has been received, to the second input in order to be digitized.

7. The measurement method according to claim 6, further comprising a calibration stage comprising the step of compensating a phase offset between the sampling operations performed by the ADC when sampling the first and second ultrasonic signals.

8. The measurement method according to claim 1, the processor component being a microcontroller having integrated therein a first ADC having a first input and a second ADC having a second input, the first measurement stage including the step of applying the first ultrasonic signal, after it has been received, to the first input in order to be digitized, and the step of applying the second ultrasonic signal, after it has been received, to the second input in order to be digitized.

9. The measurement method according to claim 1, wherein each of the first and second ultrasonic signals comprises in succession preliminary lobes and then measurement lobes, the measurement lobes being used for estimating the value DtoF, the preliminary lobes not being used since they are potentially inaccurate, the predetermined standby duration ($D_v$) being such that the processor component is reactivated after at least some of the preliminary lobes of the first ultrasonic signal have been received by the second transducer and at least some of the preliminary lobes of the second ultrasonic signal have been received by the first transducer.

10. The measurement method according to claim 1, wherein the value DToF is estimated by performing a zero crossing type method both on the first ultrasonic signal and on the second ultrasonic signal.

11. The measurement method according to claim 1, wherein the value DToF is estimated by performing a cross correlation method on the first and second ultrasonic signals.

12. An ultrasonic fluid meter comprising a first transducer, a second transducer, and a measurement module connected to the first transducer and to the second transducer, the measurement module comprising a processor component, the processor component being arranged to perform the measurement method according to claim 1.

13. A computer program including instructions for enabling the processor component of the ultrasonic fluid meter to perform the measurement method according to claim 1.

14. Storage means wherein they store a computer program including instructions for enabling the processor component of the ultrasonic fluid meter to perform the measurement method according to claim 1.

* * * * *